United States Patent [19]

Masumoto et al.

[11] Patent Number: 5,013,346
[45] Date of Patent: May 7, 1991

[54] METHOD OF MAKING ADDITIVE POWDERS FOR COATING MATERIALS OR PLASTICS

[75] Inventors: Tsuyoshi Masumoto, 8-22, Uesugi 3-chome, Sendai-shi, Miyagi-ken; Akihisa Inoue, Sendai; Masahiro Oguchi; Yoshio Harakawa, both of Tokyo, all of Japan

[73] Assignees: Teikoku Piston Ring Co., Ltd., Tokyo, Japan; Tsuyoshi Masumoto, Japan

[21] Appl. No.: 419,153

[22] Filed: Oct. 10, 1989

Related U.S. Application Data

[62] Division of Ser. No. 261,972, Oct. 24, 1988, Pat. No. 4,891,068.

[30] Foreign Application Priority Data

| May 12, 1988 | [JP] | Japan | 63-115485 |
| May 12, 1988 | [JP] | Japan | 63-115486 |
| Jun. 17, 1988 | [JP] | Japan | 63-149450 |
| Jun. 17, 1988 | [JP] | Japan | 63-149451 |
| Jul. 22, 1988 | [JP] | Japan | 63-183098 |

[51] Int. Cl.$^5$ ............... C03B 19/00; B22F 9/08
[52] U.S. Cl. ............... 65/21.2; 65/21.1; 65/21.5; 75/334; 164/46
[58] Field of Search ............... 264/8, 12; 75/0.5 C, 75/333, 334; 164/46, 47; 65/21.1, 21.2, 21.5

[56] References Cited

U.S. PATENT DOCUMENTS

| 4,027,718 | 6/1977 | Lungren | 164/46 |
| 4,050,960 | 9/1977 | Nakamura et al. | 48/16 |
| 4,221,587 | 9/1980 | Ray | 75/0.5 C |
| 4,259,270 | 3/1981 | Winter et al. | 264/8 |
| 4,386,896 | 6/1983 | Ray | 425/7 |
| 4,402,884 | 9/1983 | Koike et al. | 75/334 |
| 4,419,060 | 12/1983 | Speier et al. | 425/8 |
| 4,592,781 | 6/1986 | Cheney et al. | 75/249 |
| 4,701,289 | 10/1987 | Liles et al. | 264/8 |
| 4,731,517 | 3/1988 | Cheney | 219/121 PY |
| 4,743,297 | 5/1988 | Kopatz et al. | |

FOREIGN PATENT DOCUMENTS

| 54-38258 | 3/1979 | Japan | 164/46 |
| 55-113806 | 9/1980 | Japan | 164/46 |

*Primary Examiner*—Mary Lynn Theisen
*Attorney, Agent, or Firm*—Frishauf, Holtz, Goodman & Woodward

[57] ABSTRACT

The present invention provides an additive powder for coating materials or plastics, comprising a particle of a metal or glass, comprised of a particle having a thickness of 0.5 to 5 μm, a minor axis/major axis of from 5 to 500 μm, an aspect ratio (ratio of the major axis to the thickness) of not less than 5, and a ratio of the minor axis to the major axis, of from 1 to 10, and having the shape of a leaf as a whole. This powder can be prepared by melting a metal or glass, bringing the resulting melt to flow out from a nozzle and jetting a gas to the melt to form droplets of the melt, and bringing said droplets, before they solidify, to collied against the surface of a rotating cooling member having the shape of an cone or horn and provided in the directio of the flow of said droplets, followed by cooling to effect solidification. This powder can readily cause the leafing phenomenon when added in coating materials and coated, and hence the coating surface can be effectively covered with the powder, so that it can impart superior corrosion resistance and weathering resistance as compared with conventional powders. It can also impart superior electromagnetic shielding properties when added in plastics or rubbers.

24 Claims, 2 Drawing Sheets

METHOD OF MAKING ADDITIVE POWDERS FOR COATING MATERIALS OR PLASTICS

This is a division of application Ser. No. 07/261,972, filed Oct. 24, 1988, now U.S. Pat. No. 4,891,068, issued Jan. 2, 1990.

BACKGROUND OF THE INVENTION

The present invention relates to an additive powder for coating materials or plastics, that is suited to be mixed in coating materials to impart corrosion resistance and weathering resistance, or to be mixed in plastics or rubbers to impart electromagnetic shielding properties or magnetic shielding properties, and a method of preparing the same.

Hitherto used as coating materials used in the field where corrosion resistance and weathering resistance are required are those mixed with powders comprising glass or metals. These powders can be grouped into (1) those in which the powder itself has corrosion resistance and the corrosion resistance can be imparted by covering a coating surface with the powder, as exemplified by glass powders and stainless steel powders, (2) those in which the powder serves as a sacrificial electrode to prevent corrosion of a coating surface, as exemplified by zinc powders, and (3) those which can improve weathering resistance by application of a metallic coating, as exemplified by aluminum powders.

Of these powders, used as the glass powders are those which resemble fragments of spheres obtained by breaking glass balloons.

Used as the stainless steel powders are those obtained by bringing a rolled sheet of stainless steel into intergranular corrosion followed by physical grinding, or those obtained by subjecting molten stainless steel to water-atomizing to form powder and physically forcing the powder to have flat particles by means of a stamp mill or the like.

Used as the zinc powders are those obtained by heating and vaporizing a zinc metal in a retort, introducing the resulting zinc vapor into an air-cut-off condensor to effect rapid-cooling condensation, thus obtaining spherical powder, and physcially forcing the resulting powder to have flat particles by means of a stamp mill or the like.

Used as the aluminum powders are those prepared by subjecting molten aluminum to gas-atomizing to obtain powder, and physically forcing the powder to have flat particles.

Recent years, a variety of amorphous alloys having good corrosion resistance have been also developed, and attempts have been made to impart better corrosion resistance by forming these amorphous alloys into powder and mixing the powder into a coating material.

As an example of such attempts, proposed in Japanese Unexamined Patent Publications No. 252668/1985 and No. 252669/1985 is to add in a coating material an amorphous alloy powder comprising scaly particles of several ten to several hundred $\mu m$ in length or width and not more than 5 $\mu m$ in thickness.

In general, those comprising leaf-shaped particles are considered to be preferred as these additive powders for coating materials. This is because, when the powders are mixed in a coating resin material and the mixture is coated by brushing or spraying, the powder particles are laid overlapping in parallel with the coating surface owing to the surface tension produced in the curing of the resin (this is called a leafing phenomenon) to form a continuous film comprised of the powder, thus protecting materials from the air and imparting good corrosion resistance and weathering resistance. However, even this leaf-shaped powder may cause the problem that the smoothness of a coating becomes poorer with increase in thickness of powder particles. Moreover, the leaf-shaped particle having an excessively long major axis tends to cause the cracking or peeling of the coating, resulting in a lowering of the strength of the coating.

While, the glass powders prepared by breaking glass balloons, which resemble fragments of spheres, can not give a perfect flatness, and hence can not cause the above leafing phenomenon in a good state, so that it has been impossible to impart sufficient corrosion resistance.

The stainless steel powders obtained by bringing a rolled sheet into intergranular corrosion followed by physical grinding or the stainless steel, zinc or aluminum atomized powders physically forced to have flat particles also tend to become irregular in their shapes, so that it has been impossible to obtain those comprising sufficiently thin and flat particles. For this reason, it has been still impossible to cause the above leafing phenomenon in a good state.

In the case of the above amorphous alloy powders described in Japanese Unexamined Patent Publications No. 252668/1985 and No. 252669/1985, limitations are made on the length, width and thickness in respect of the particle shape. However, in order to cause the leafing phenomenon in a good state and impart a good corrosion resistance, consideration should have been taken also in respect of a required minimum thickness, aspect ratio (ratio of the major axis to thickness), ratio of the major axis to the minor axis, or the like.

The above amorphous alloy powders are prepared by dropping from the upper part a powder previously formed into alloy by the method such as atomizing, bringing the powder to melt on the way it falls, with use of a heat source such as an acetylene flame, an oxygen-hydrogen flame or an oxygen-propane flame blown out from a nozzle concentrically disposed, and rapid-cooling the molten droplets simultaneously with the rolling by use of a twinroll mill.

According to this method, however, it has been difficult to prepare a powder comprising particles having the shape defined in respect of the minimum thickness, aspect ratio (ratio of the major axis to thickness), or ratio of the major axis to the minor axis. Moreover, since in this method the powder is brought to melt on the way it falls, the powder can not be fed in a large quantity, so that it has been impossible to produce the desired powder in a large quantity in an industrial scale.

Also known as methods of preparing a flaky powder with use of the amorphous alloy are a method in which hydrogen is adsorbed in a ribbon or strip prepared according to a conventional single roll method or cavitation method to make it brittle, followed by grinding by means of a stamp mill or ball mill, and a method in which a melt is atomized on the roll surface int eh single roll method to prepare a powder comprising particles of irregular shapes.

In these methods, however, the resulting powder has a particle thickness usually of from 5 to 20 $\mu m$ in approximation, and hence cracking may sometimes occur on the coating when the resulting powder is mixed in resin and used as a coating material, and thus could not been said to be suitable as a powder for coating materials.

On the other hand, in various plastics or rubbers, known are those in which a conductive filler is added in order to impart the action of electromagnetic shielding, or a reinforcing filler is added in order to reinforce plastics. Particularly used as the conductive filler is a metal filler comprising copper, nickel, silver or the like.

Widely used as these metal fillers are fibrous or dendritic fillers prepared by cutting metals according to a chatter vibrating method using a lathe turning machine.

Since, however, also all of these metal fillers are fibrous or dendritic, a number of gaps are formed between fillers when they are mixed into plastics or rubbers, showing the tendency that no sufficient effect can be obtained particularly in the case of metal fillers used for the purpose of electromagnetic shielding.

SUMMARY OF THE INVENTION

An object of the present invention is to provide an additive powder for coating materials, that can impact superior corrosion resistance and weathering resistance.

Another object of the present invention is to provide additive powder for plastics or rubbers, that can impart superior electromagnetic shielding properties.

Still another object of the present invention is to provide a method of preparing a powder to be added in coating materials, plastics or rubbers, that can obtain the above powder in a large quantity and in a high yield in an industrial scale.

To achieve the above objects, the additive powder for coating materials or plastics is characterized by comprising a particle of a metal or glass, wherein said particle has a thickness of 0.5 to 5 μm, a minor axis/major axis of from 5 to 500 μm, an aspect ratio (ratio of the major axis to the thickness) of not less than 5, and a ratio of the minor axis to the major axis, of from 1 to 10, and has the shape of a leaf (preferably, an elliptical leaf) as a whole.

The method of preparing the additive powder for coating materials or plastics of the present invention is characterized by melting a metal or glass, bringing the resulting melt to flow out from a nozzle and jetting a gas to the melt to form droplets of the melt, and bringing said droplets, before they solidify, to collide against the surface of a rotating cooling member having the shape of a cone or horn and provided in the direction of the flow of said droplets, followed by cooling to effect solidification.

Since the powder of the present invention comprises particles having the shape properties as described above, it can readily cause the leafing phenomenon when added in coating materials and coated, and hence the coating surface can be effectively covered with the powder, so that it can impart superior corrosion resistance and weathering resistance as compared with conventional powders. The addition of the powder can also maintain the smoothness or strength of the coating in a good state.

Since also the powder of the present invention comprises particles having the shape properties as described above, it has a larger surface area, and hence it can impart superior electromagnetic shielding properties when added in plastics. In this instance, when press molding of plastics is carried out, the particles of the powder are oriented in parallel to each other owing to the pressure by pressing and the planes of the particles face in the same direction, so that it can impart more superior electromagnetic shielding properties with respect to a specific direction.

Moreover, the preparation method of the present invention is characterized by bringing the droplets of the melt to collide against the cone or horn type rotating cooling member, and this preparation method enables production of the powder comprising the particles having the above shape properties in a high yield (for example, 70% or more) and in a large quantity. In this connection, bringing the droplets of the melt to collide against a cylindrical rotating cooling member as conventionally used in preparing amorphous alloys results largely in formation of powder comprising particles having a non-uniform thickness and also having irregular shapes, and hence it has been impossible to prepare the powder comprising the particles having the above shape properties.

The reason why the powder comprising the particles having the above shape properties can be efficiently prepared according to the present invention is considered as follows: Employment of the cone or horn type rotating cooling member brings the surface of the rotating cooling member to be obliquely disposed in the direction of the flow of the droplets. As a result, when the droplets collide against the oblique surface of the rotating cooling member, each droplet extends in the direction of the rotation of the rotating cooling member owing to the centrifugal force and at the same time extends also along the oblique surface of the rotating cooling member owing to the drop kinetic energy. Thus, the droplet is more widely extended and formed into a thin leaf-shaped powder particles.

Figure 5:
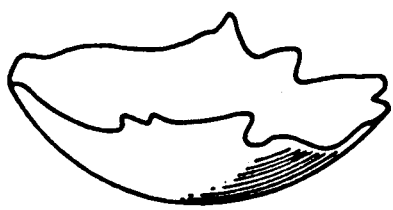
Figure 6:
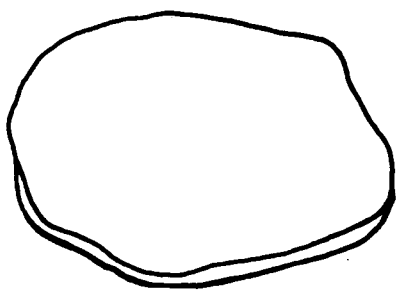

FIG. is a scanning electron microscope photograph of 90 magnifications of an amorphous aluminum alloy powder obtained in Example 2;

FIG. 5 is a perspective view illustrating the particle shape of a powder obtained by crushing a glass balloon; and FIG. 6 is a perspective view illustrating the particle shape of a glass powder obtained by the preparation method of the present invention.

DESCRIPTION OF THE PREFERRED EMBODIMENTS

In the present invention, the particle constituting the powder has a thickness of 0.5 to 5 μm, a minor axis/major axis of from 5 to 500 μm, an aspect ratio (ratio of the major axis to the thickness) of not less than 5, and a ratio of the minor axis to the major axis of from 1 to 10, and has the shape of a leaf as a whole. Particularly when used as an additive powder for coating materials, the above thickness otherwise less than 0.5 μm brings about a problem in maintaining the corrosion resistance over a long period of time, and the thickness otherwise more than 5 μm may result in poor smoothness of a coating. The minor axis otherwise less than 5 μm may result in non-uniformity in the mutual overlapping of powder particles, and the major axis otherwise more than 500 μm may cause deterioration of the strength of a coating. Also, the aspect ratio otherwise less than 5 makes it difficult to cause the leafing phenomenon. Further, the ratio of the minor axis to the major axis otherwise more than 10 tends to produce gaps between powder particles, making it impossible to effectively impart the intended properties. In a preferred embodiment of the present invention, the above particle may more preferably have a thickness of 1 to 4 μm, a minor axis/major axis of from 5 to 400 μm, an aspect ratio of not less than 5, and a ratio of the minor axis to the major axis of from 1 to 5.

In the present invention, what is meant by "a minor axis/major axis of from 5 to 500 μm" is that, when the leaf-shaped particle is viewed from the direction perpendicular to its plane, the axis at the shortest part does not come to be less than 5 μm and the axis at the longest part does not exceed 500 μm.

The powder of the present invention may preferably comprise at least one selected from the following materials (1) to (b 11).

(1) An amorphous alloy consisting of from 5 to 12% of Ni, from 5 to 25% of Cr, from 0.3 to 5.0% of Mo, from 8 to 13% of P, from 7 to 15% of C, all in atom %, and the balance of Fe and inevitable impurities;

(2) an amorphous alloy consisting of from 5 to 40% of Cr, from 15 to 25% of P, all in atom %, and the balance of Ni and inevitable impurities;

(3) an amorphous alloy consisting of from 40 to 60% of (Nb, Ta) in atom %, and the balance of Ni and inevitable impurities;

(4) an aluminum alloy having the composition represented by the general formula: $Al_aM_bX_c$ wherein M represents one or more of metallic elements(s) selected from the group consisting of V, Cr, Mn, Fe, Co, Ni, Cu, Zr, Ti, Mo, W, Ca, Li, Mg and Si; X represents one or more element(s) selected from the group consisting of Y, La, Ce, Sm, Nd, Hf, Nb, Ta and Mm (Misch metal); and a, b and c are $50 \leq a \leq 95$, $0.5 \leq b \leq 35$ and $0.5 \leq c \leq 25$ in atom %, respectively);

and comprising an amorphous phase or an amorphous and finely crystalline mixed phase;

(5) glass;
(6) zinc;
(7) stainless steel;
(8) aluminum;
(9) copper;
(10) nickel; and
(11) silver, In the above, materials (1), (2), (3), (5) and (7) are suitably used when added in coating materials for the purpose of imparting corrosion resistance. Powders of these have corrosion resistance in themselves, and the corrosion resistance can be imparted by covering a coating surface with any of these powders. Among these, materials (1), (2) and (3), as being amorphous, can impart better corrosion resistance.

Also, material (6) is suitably used when added in coating materials for the purpose of imparting corrosion resistance. Provided that material (6) serves as a sacrificial electrode in itself, thus preventing the corrosion of a coating surface.

Materials (4) and (8) are suitably used when added in coating materials for the purpose of imparting weathering resistance, for example, reflecting heat radiations, preventing moisture penetration, or the like purposes, and particularly suited for metallic coating. Such coating materials can be used also as outdoor silver coating materials. Material (4) also has excellent corrosion resistance, as having an amorphous phase formed in part at least.

Materials (9), (10) and (11) are suitably used when added in plastics or rubbers for the purpose of imparting electromagnetic shielding properties. These metals, as having a high conductivity, can impart excellent electromagnetic shielding properties.

The composition defined for materials (1), (2), (3) and (4) is the composition with which an amorphous phase can be readily formed by rapid-cooling solidification, and the composition outside the above composition makes it difficult to form the amorphous phase.

In the instance where the powder of the present invention is used as an additive for coating materials, the powder may preferably be added in the coating materials in an amount approximately of from 5 to 20 vol.%. The amount of the powder otherwise less than 5 vol.% results, when coated, in increase of the part consisting only of the basis coating material in the coating, bringing about no sufficient effect of mixing the powder. Also, the amount otherwise more than 20 vol.% may result in weakness in the strength of the resulting coating, and tends to cause cracking or peeling or worsen the coating adhesion. Provided that this amount can be appropriately varied depending on the types of the powder and coating materials to be used.

As binder components in the coating materials, freely usable are a variety of synthetic resins commonly used in coating materials, but preferably used are vinyl resins, acrylic resins, polyurethane resins, epoxy resins or the like. Provided that the binder components for the coating materials are meant to include monomers or oligomers of these resins, in the case of the coating materials that are cured after coating.

In the coating materials, there can be optionally added solvents, hardening agents, pigments, thickening agents, dispersing agents, stabilizers and so forth, in addition to the above powder and the binder components. The solvents may be appropriately selected depending on the type of the resins to be used, and, for example, usable are xylene, toluene, alcohol, acetone, ethyl acetate and water. As to the type of the coating materials, there can be employed various types such as a solvent type, an emulsion type, a non-emulsion type and a powder type.

In organic binders can also be used as the binder components for the coating materials. Here is exemplified by the coating material that uses as a binder what is obtained by adding a small amount of sodium bicarbonate in an aqueous sodium silicate solution, and is hardened by a spraying an aqueous phosphoric acid solution after coating.

This coating material can be coated by various methods as exemplified by brushing and spray coating. In this occasion, in order to disperse the powder to bring about good adhesion, a surface treatment may be applied using surface treatment agents such as surface active agents and covering agents and surface improvers before coating.

In the instance where the powder of the present invention is used as a filler for plastics, the power may preferably be mixed in plastics in an amount of from 10 to 60% by weight. The amount otherwise less than 10% by weight makes it impossible to obtain sufficient effect of mixing the powder, and the amount otherwise more than 60% by weight tends to result in an adverse influence given to the appearance or strength of plastics.

As the plastics, freely usable are various resins as exemplified by thermoplastic resins such as polyethylene, polypropylene, polystyrene and polyvinyl chloride, thermosetting resins such as phenol resins, epoxy resins, unsaturated polyester resins and polyurethanes, as well a natural rubbers and synthetic rubbers. It is also a matter of discretion to add reinforcing materials such as glass fiber, or plasicizers, stabilizers, coloring agents, etc. if necessary.

A most preferred method of molding plastics is press molding for the reason that the poser particles are oriented in the same direction, but it is also possible to employ other molding methods such as injection molding and extrusion. To improve the electromagnetic shielding properties, the powder particles may preferably be oriented in the same direction, but, even if the powder particles are oriented at random, the properties better than the conventional fibrous or dendritic fillers can be imparted since the powder of the present invention comprises leafy particles having large surface areas.

Figure 1:
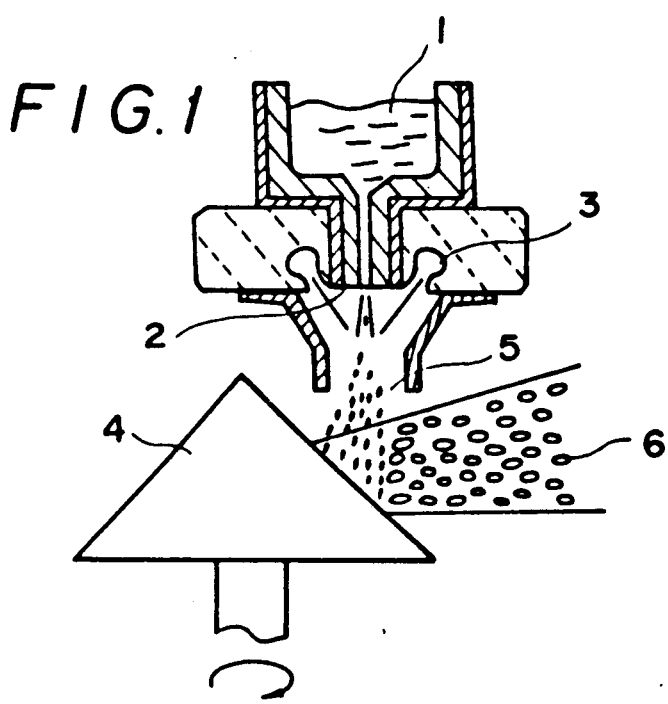
FIG. 1 is a cross section schematically illustrating an example of the apparatus for carrying out the preparation method of the present invention.

FIG. 1 illustrates an example of an apparatus for carrying out the preparation method of the present invention.

Materials to be formed into powder are melted using an apparatus such as a high frequency melting furnace or a resistance furnace. The melting temperature may be set to (temperature of the material) plus 50 to 300° C. in approximation. There is provided a nozzle 2 to bring the resulting melt 1 to flow out, and is also provided an atomizing nozzle 3 to spray a high pressure jet gas against the melt 1 dropping. The atomizing nozzle 3 is provided, for example, in a circular form so as to surround the nozzle 2, and has the structure that a high-speed gas is jetted from a number of jet outlets toward the flow of the melt 1. Below the nozzle an umbrella type rotating cooling member 4 is so provided that is rotating shaft is at the position a little shifted to the side direction from right beneath the nozzle 2.

Figure 2B:
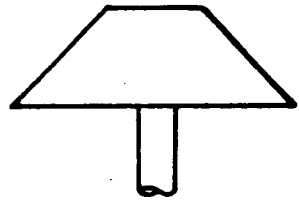
FIG 2(a) and FIG. 2(b) are views respectively illustrating other examples of the rotating cooling member used in the above apparatus.
Figure 2A:
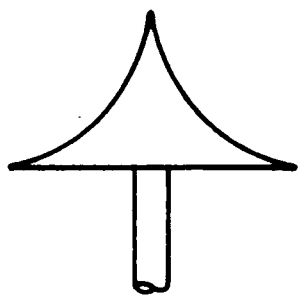

Thus, the high-pressure jet gas is sprayed from the atomizing nozzle 3 against the flow of the melt 1 that flows out from the nozzle 2 and drops, whereby droplets 5 of the melt are formed. The droplets 5 scatter while spreading downwards, collide against the inclined surface of the rotating cooling member 4, and solidified by cooling, where leaf-shaped powder 6 comprising flatened particles are formed. In the present apparatus, an cone type member is used as the rotating cooling member 4, but it is also possible to use a hone type member as illustrated in FIG. 2(a). It may also comprise the rotating cooling member such that, as illustrated in FIG. 2(b), the cone type or horn type member was cut away on the part of its vertical angle to have a trapezoidal cross section. There can be used a rotating cooling member having a vertical angle of not less than 20° and less than 180°. Incidentally, the smaller the vertical angle is small, the steeper the slope of the conical surface becomes, so that the powder tends to have a slender particle shape having a greater ratio of the minor axis to the major axis. On the other hand, the greater the vertical angle is, the more gentle the slope of the conical surface becomes, so that the powder tends to have a round particle shape having a smaller ratio of the minor axis to the major axis.

The gas may preferably jetted from the atomizing nozzle 3 under a pressure of not less than 20 kg/cm$^2$, more preferably not less than 40 kg/cm$^2$, and still more preferably not less than 70 kg/cm$^2$. Usable as the gas are various gases such as argon, helium, nitrogen, air or a mixed gas. Also, the rotating cooling member 4 may preferably be cooled to at least not more than 400° C. by means of, for example, water cooling. In the case when the powders of the amorphous alloys (1) to (4) described above are formed, it may preferably be cooled to not more than 50° C. The revolution number of the rotating cooling member 4 may preferably be set to from 1,000 to 20,000 rpm, more preferably from 3,000 to 12,000 rpm.

In the preparation method of the present invention, using any of materials (1) to (11) as a starting material makes it possible to obtain powders comprising the materials corresponding to materials (1) to (11), respectively. Provided that the materials (1) to (4) may not necessarily be amorphous at the stage of the starting material, and can be formed to have an amorphous phase in the preparation process of the present invention by bringing them to collide against the rotating cooling member 4 followed by rapid-cooling solidification.

EXAMPLES

The present invention will be described below in greater detail by giving several Experiments and examples. However, the present invention is by no means limited by these Experiments and Examples.

EXPERIMENT 1

Evaluation on corrosion resistance of amorphous alloy

Every alloy having the composition as shown in Table 1 was vacuum-melted and thereafter jetted from a quarts nozzle of 0.4 mm in bore diameter under an argon gas jet pressure of 1.0 kg/cm$^2$, and this melt was brought to collide against a single roll rotating at a peripheral speed of 30 m/sec to obtain thin ribbons. The resulting thin ribbons were about 1 mm in width and about 30 μm in thickness, and X-ray diffraction confirmed that each of them had an amorphous single phase.

On each of the resulting thin ribbons, tests were made to examine how they corroded after immersed in 6N-HCl at 30° C. for 24 hours, after immersed in 1N-H$_2$SO$_4$ at 30° C. for 24 hours, and after immersed in 10 mol-FeCl$_3$ at 40° C. for 1 hour. Evaluation was made on the bases of the criterions as follows:

A: No change was seen on the surface.
B: Pits are seen.
C: Seriously corroded.

Evaluation of toughness was also made on each of the resulting thin ribbons to examine whether they can be bond-bended to 180°. On the bases of the evaluation results on the above corrosion resistance and toughness, overall evaluation was made as follows:

AA: Suited to alloy powder for use in corrosion-resistant

C: Unsatisfactory as alloy powder for use in corrosion-resistant coating materials.

For comparison, besides the above thin ribbons of amorphous alloys, evaluation was also made on the similar tests in respect of commercially available sustenite stainless steels SUS304 and SUS316L. Results obtained are shown in Table 1 (set out later).

Table 1 can tell that samples Nos. 9, 10, 16 to 21, 24 to 28 having the composition regarded as being within the range of (1) from 5 to 12% of Ni, from 5 to 25% of Cr, from 0.3 to 5.0% of Mo, from 8 to 13% of P, from 7 to 15% of C, all in atom %, and the balance of Fe and inevitable impurities, (2) from 5 to 40% of Cr, from 15 to 25% of P, all in atom %, and the balance of Ni and inevitable impurities, or (3) from 40 to 60% of (Nb, Ta) in atom %,, and the balance of Ni and inevitable impurities, have the properties suited as alloy powder for use in corrosion-resistant coating materials.

EXAMPLE 1

1. Preparation of alloy powders

Using the apparatus as illustrated in FIG. 1, 500 g each of the alloys respectively having the composition of samples Nos. 9, 10, 17, 19, 21, 24, 25 and 26 in Table 1 was charged in a crucible, and was melted at 1,200° C. to make the melt 1.

The resulting melt 1 was flowed out and dropped from the nozzle 2, and argon gas was sprayed from the atomizing nozzle 3 against the dropping melt 1 under a pressure of 100 kg/cm$^2$ to form the droplets 5. The droplets 5 were brought to collide against a rotating cooling member having a roll diameter of 200 mm$\phi$, a cone angle of 90° and a revolution number of 7,200 rpm to obtain a flaky alloy powder comprising leaf-shaped particles.

Figure 3:
FIG. 3 is a scanning electron microscope photograph of 100 magnifications of an amorphous alloy powder obtained in Example 1.

In FIG. 3, shown is a scanning electron microscope photograph of 100 magnifications of an alloy powder obtained using the alloy of sample No. 9 and according to the above method.

Alloy powders having each composition, obtained by the above method, were classified and batched off to give those having the shape properties as shown in Table 2. Incidentally, the yield of the powder comprising particles having a thickness of 0.5 to 5 μm, a minor axis/major axis of from 5 to 500 μm, an aspect ratio (ratio of the major axis to the thickness) of not less than 5, and a ratio of the minor axis to the major axis, of from 1 to 10, which are the shape properties according to the present invention, exceeded 70% in all portions.

In regard to the powder obtained using the alloy of sample No. 9, prepared were those comprising particles having a thickness of from 1 to 4 μm, an aspect ratio (ratio of the major axis to the thickness) of 10 to 100, a ratio of the minor axis to the major axis, of from 1 to 5, and a minor axis/major axis of from 5 to 400 μm (sample No. 9-1); having a thickness of less than 0.5 μm, an aspect ratio (ratio of the major axis to the thickness) of 5 or more, a ratio of the minor axis to the major axis, or from 1 to 5, and a minor axis/major axis of from 5 to 400 μm (sample No. 9-2); having a thickness of from 1 to 4 μm, an aspect ratio (ratio of the major axis to the thickness) of less than 5, a ratio of the minor axis to the major axis, of from 1 to 10, and a minor axis/major axis of from 5 to 36 μm (sample No. 9-3); having a spherical shape (sample No. 9-4); and having a thickness of from 1 to 4 μm, an aspect ratio (ratio of the major axis to the thickness) of 5 or more, a ratio of the minor axis to the major axis, of from 1 to 5, and a major axis of 500 μm or more (sample No. 9-5); respectively.

For comparison, further prepared was a SUS304 stainless steel powder (sample No. 13) used in commercially available corrosion-resistant coating materials. This powder comprises particles having a thickness of less than 0.5 μm, an aspect ratio (ratio of the major axis to the thickness) of 5 or more, a ratio of the minor axis to the major axis, of from 1 to 10, and a minor axis/major axis of less than 36 μm.

2. Preparation of coating materials

Coating materials were prepared by mixing 85 vol.% of a polyvinyl acetate resin as a resin binder and 15 vol.% of each of the metal powders obtained in the above.

3. Evaluation of properties of coatings

SS41 steel sheets of 3 mm in thickness, 20 mm in width and 50 mm in length were made ready for use and applied with sandblasting treatment. Thereafter, they were subjected to ultrasonic washing in Trichlene, and the respective coating materials prepared in the above were coated thereon by brushing so as to give a coating thickness of about 100 μm. After drying, observed was the state of the coatings and also carried out were corrosion resistance tests. The corrosion resistance tests were carried out by immersing the coatings in aqua regia of 20° C. to examine the time by which the mother materials were melted out. Results thus obtained are shown in Table 2 (set out below).

Table 2 can tell that, as compared with the sample No. 13 containing the conventional SUS304 stainless steel powder, superior corrosion resistance can be obtained by the samples Nos. 9-1, 9-2, 9-3, 9-5, 10, 17, 19, 21, 24, 25 and 26 containing the amorphous alloy powder. However, overall evaluation of the state of the coatings and the corrosion resistance can tell that particularly preferred are the samples Nos. 9-1, 10, 17, 19, 21, 24, 25 and 26 that contain the powder specified in the present invention to comprise particles having a thickness of 0.5 to 5 μm, a minor axis/major axis of from 5 to 500 μm, an aspect ratio (ratio of the major axis to the thickness) of not less than 5, and a ratio of the minor axis to the major axis, of from 1 to 10.

TABLE 1

| Sample | Chemical composition | | | | | | | Corrosion test in 6N—HCl | Corrosion test in 1N—H$_2$SO$_4$ | Corrosion test in 10 mol-FeCl$_3$ | Structure | Toughness | Overall evaluation |
|---|---|---|---|---|---|---|---|---|---|---|---|---|---|
| | Fe | Ni | Cr | Mo | P | C | Others | | | | | | |
| No. 1 | Bal. | — | — | — | 13 | 7 | — | C | — | C | Amorphous | C | C |
| No. 2 | " | — | — | — | 10 | 10 | — | C | — | C | " | C | C |
| No. 3 | " | — | — | — | 10 | 14 | — | C | — | C | " | C | C |
| No. 4 | " | 5 | 5 | — | 13 | 7 | — | B | A | B | " | A | C |
| No. 5 | " | 10 | 5 | — | 13 | 7 | — | B | A | B | " | A | C |
| No. 6 | " | 5 | 10 | — | 13 | 7 | — | B | A | B | " | A | C |
| No. 7 | " | 10 | 10 | — | 13 | 7 | — | B | A | B | " | A | C |
| No. 8 | " | 10 | 15 | — | 13 | 7 | — | B | A | B | " | A | C |
| No. 9 | " | 10 | 10 | 2 | 12 | 8 | — | A | A | A | " | A | AA |
| No. 10 | " | 5 | 15 | 2 | 11 | 10 | — | A | A | A | " | A | AA |
| No. 11 | " | — | 10 | — | 11 | 10 | — | B | A | B | " | A | C |
| No. 12 | " | — | 15 | — | 11 | 11 | — | B | A | B | " | A | C |
| No. 13 | Stainless steel 304 | | | | | | | C | A | C | Crystalline | C | C |
| No. 14 | Stainless steel 316 | | | | | | | C | A | C | Crystalline | C | C |

TABLE 1-continued

| Sample | Chemical composition | | | | | | Corrosion test in 6N—HCl | Corrosion test in 1N—H$_2$SO$_4$ | Corrosion test in 10 mol·FeCl$_3$ | Structure | Toughness | Overall evaluation |
|---|---|---|---|---|---|---|---|---|---|---|---|---|
| | Ni | Cr | P | Ta | Nb | Others | | | | | | |
| No. 15 | Bal. | 3 | 20 | — | — | — | C | A | C | Amorphous | A | C |
| No. 16 | " | 10 | 18 | — | — | — | A | A | A | " | A | AA |
| No. 17 | " | 15 | 18 | — | — | — | A | A | A | " | A | AA |
| No. 18 | " | 20 | 19 | — | — | — | A | A | A | " | A | AA |
| No. 19 | " | 25 | 18 | — | — | — | A | A | A | " | A | AA |
| No. 20 | " | 30 | 18 | — | — | — | A | A | A | " | A | AA |
| No. 21 | " | 35 | 19 | — | — | — | A | A | A | " | A | AA |
| No. 22 | " | 45 | 19 | — | — | — | A | A | A | " | C | C |
| No. 23 | " | 25 | 13 | — | — | — | C | A | C | Crystalline | C | C |
| No. 24 | " | — | — | 45 | — | — | A | A | A | Amorphous | A | AA |
| No. 25 | " | — | — | — | 45 | — | A | A | A | " | A | AA |
| No. 26 | " | — | — | 20 | 25 | — | A | A | A | " | A | AA |
| No. 27 | " | — | — | 55 | — | — | A | A | A | " | A | AA |
| No. 28 | " | — | — | — | 55 | — | A | A | A | " | A | AA |
| No. 29 | " | — | — | 65 | — | — | A | A | A | Crystalline | C | C |
| No. 30 | " | — | — | — | 65 | — | A | A | A | " | C | C |
| No. 31 | " | — | — | 35 | — | — | A | A | C | " | C | C |
| No. 32 | " | — | — | — | 35 | — | A | A | C | " | C | C |

TABLE 2

| Sample No. | Alloy composition (atom %) | Particle thickness (μm) | Aspect ratio | Minor axis/ major axis ratio | Minor axis/ major axis dimension (μm) | State of coatings | Corrosion resistance test |
|---|---|---|---|---|---|---|---|
| 9-1 | Fe(Bal.)-10Ni—10Cr—2Mo—12P—8C | 1~4 | 10~100 | 1~5 | 5~400 | Good coating, well oriented | Good after 25 hrs |
| 9-2 | Fe(Bal.)-10Ni—10Cr—2Mo—12P—8C | <0.5 | ≧5 | " | " | Many holes in coating with poor orientation | Ground red-rusted after 25 hrs |
| 9-3 | Fe(Bal.)-10Ni—10Cr—2Mo—12P—8C | 1~4 | <5 | 1~10 | 5~36 | Poorly oriented | Ground corroded after 25 hrs |
| 9-4 | Fe(Bal.)-10Ni—10Cr—2Mo—12P—8C | | Spherical powder | | | Good smoothness, easily coated | Ground corroded after 16 hrs |
| 9-5 | Fe(Bal.)-10Ni—10Cr—2Mo—12P—8C | 1~4 | ≧5 | 1~10 | >500 | Poor surface smoothness | Not tested |
| 10 | Fe(Bal.)-5Ni—15Cr—2Mo—11P—10C | " | " | " | 10~500 | Well oriented with good smoothness | Good after 25 hrs |
| 17 | Ni(Bal.)-15Cr—18P | " | " | " | " | Well oriented with good smoothness | " |
| 19 | Ni(Bal.)-25Cr—18P | " | " | " | " | Well oriented with good smoothness | " |
| 21 | Ni(Bal.)-35Cr—19P | " | " | " | " | Well oriented with good smoothness | " |
| 24 | Ni(Bal.)-45Ta | " | " | " | " | Well oriented with good smoothness | Good after 30 hrs |
| 25 | Ni(Bal.)-45Nb | " | " | " | " | Well oriented with good smoothness | " |
| 26 | Ni(Bal.)-20Ta—25Nb | " | " | " | " | Well oriented with good smoothness | " |
| 13 | Stainless steel 304 | <0.5 | " | " | ~36 | Well oriented with good smoothness | Ground corroded after 10 hrs |

EXPERIMENT 2

Evaluation on corrosion resistance of aluminum alloy

Every aluminum alloy having the composition as shown in Table 3 was vacuum-melted and thereafter jetted from a quarts nozzle of 0.4 mm in bore diameter under an argon gas jet pressure on 1.0 kg/cm$^2$, and this melt was brought to collide against a single roll rotating at a peripheral speed of 30 m/sec to obtain thin ribbons. The resulting thin ribbons were about 1 mm in width and about 30 μm in thickness, and X-ray diffraction and TEM observation confirmed that each of them had an amorphous phase or an amorphous and finely crystalline mixed phase.

On each of the resulting thin ribbons, tests were made to examine how they corroded after immersed in 1N-HCl at 30° C. for 3 hours and after immersed in 1N-NaOH at 30° C. for 3 hours. Evaluation was made on the bases of the criterions as follows:

A: No change was seen on the surface.

B: Changes are seen on the surface.

C: Melted out.

Evaluation of toughness was also made on each of the resulting thin ribbons to examine whether they can be bondbended to 180°. On the bases of the evaluation results on the above corrosion resistance and toughness, overall evaluation was made as follows:

AA: Suited to alloy powder for use in corrosion-resistant coating materials.

C: Unsatisfactory as alloy powder for use in corrosion-resistant coating materials.

For comparison, besides the above thin ribbons of amorphous alloys, evaluation was also made on the similar tests in respect of commercially available Al(4N) 2024 alloy and Al-Si alloy. Results obtained are shown in Table 3.

Table 3 can tell that samples No. 1 to No. 16 having the aluminum alloy composition previously defined in (4) can impart sufficient corrosion resistance when used as additive powders for coating materials.

EXAMPLE 2

1. Preparation of alloy powders

Using the apparatus as illustrated in FIG. 1, each of the aluminum alloys respectively having the composition of samples Nos. 2, 5, 6, 9, 11, 14, and 15 in Table 3 (set out later) was charged in a crucible, and was melted at 1,000° C. to make the melt 1.

The resulting melt 1 was flowed out and dropped from the nozzle 2, and argon was sprayed from the atomizing nozzle 3 against the droping melt 1 under a pressure of 100 kg/cm$^2$ to form the droplets 5. Before solidified in the air, the droplets 5 were brought to collide against a rotating cooling member having a roll diameter of 200 mm$\phi$, a cone angle of 90° and a revolution number of 7,200 rpm to obtain a flaky alloy powder comprising leaf-shaped particles.

Figure 4:
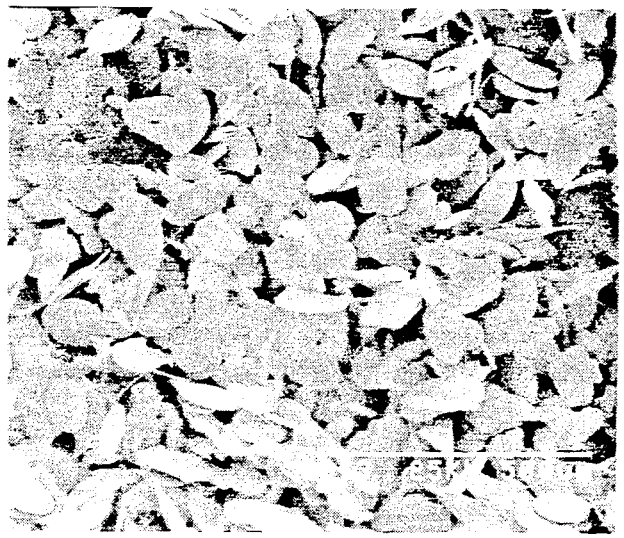

In FIG. 4, shown in a scanning electron microscope photograph of 90 magnifications of an alloy powder obtained using the alloy of sample No. 5 and according to the above method.

Alloy powders having each composition, obtained by the above method, were classified and batched off to give those having the shape properties as shown in Table 4. Incidentally, the yield of the powder comprising particles having a thickness of 0.5 to 5 μm, a minor axis/major axis of from 5 to 500 μm, an aspect ratio (ratio of the major axis to the thickness) of not less than 5, and a ratio of the minor axis to the major axis, of from 1 to 10, which are within the preferred embodiment of the present invention, exceeded 70% in all portions.

In regard to the powder obtained using the alloy of sample No. 5, prepared were those comprising particles having a thickness of from 0.5 to 4 μm, an aspect ratio (ratio of the major axis to the thickness) of 10 to 100, and a minor axis/major axis of from 10 to 400 μm (sample No. 5-1); having a thickness of less than 0.1 μm, an aspect ratio (ratio of the major axis to the thickness) of 5 or more, and a minor axis/major axis of from 10 to 400 μm (sample No. 5-2); having a thickness of from 0.5 to 4 μm, an aspect ratio (ratio of the major axis to the thickness) of less than 5, and a minor axis/major axis of from 5 to 18 μm (sample No. 5-3); having a spherical shape (sample No. 5-4); and having a thickness of from 0.5 to 4 μm, an aspect ratio (ratio of the major axis to the thickness) of 5 or more, and a major axis of 500 μm or more (sample No. 5-5); respectively.

For comparison, further prepared was an Al(4N) powder (sample No. 19) used in commercially available coating materials. This powder comprises particles having a thickness of 0.3 μm, an aspect ratio (ratio of the major axis to the thickness) of 5 or more, and a minor axis/major axis of less than 50 μm.

2. Preparation of coating materials

Coating materials were prepared by mixing 85 vol.% of a polyvinyl chloride resin as a resin binder and 15 vol.% of each of the metal powders obtained in the above.

3. Evaluation of properties of coatings

SS41 steel sheets of 3 mm in thickness, 20 mm in width and 50 mm in length were made ready for use and applied with sandblasting treatment. Thereafter, they were subjected to ultrasonic washing in Trichlene, and the respective coating materials prepared in the above were coated thereon by brushing so as to give a coating thickness of about 100 μm. After drying, observed was the state of the coatings and also carried out were corrosion resistance tests. The corrosion resistance tests were carried out by immersing the coatings in aqua regia of 20° C. to examine the time by which the mother materials were melted out. Results thus obtained are shown in Table 4 set out below).

Table 4 can tell that, as compared with the sample No. 19 containing the Al(4N) powder, superior corrosion resistance can be obtained by the samples Nos. 2, 5-1, 5-2, 5-3, 5-5, 6, 9, 11, 14 and 15 containing the aluminum alloy powder comprising an amorphous phase or an amorphous and finely crystalline mixed phase. However, overall evaluation of the state of the coatings and the corrosion resistance can tell that particularly preferred are the samples Nos. 2, 5-1, 6, 9, 11, 14 and 15 that contain the powder comprising particles having a thickness of 0.5 to 5 μm, a minor axis/major axis of from 5 to 500 μm, and an aspect ratio (ratio of the major axis to the thickness) of not less than 5. Accordingly, since they have also superior alkali resistance as compared with conventional aluminum, they can be applied as additives for water-soluble metallic coating materials.

TABLE 3

| Sample No. | Chemical composition (atom %) | Structure | Corrosion test in 1N—HCl | Corrosion test in 1N—NaOH | Toughness | Overall evaluation |
|---|---|---|---|---|---|---|
| 1 | $Al_{85}Mn_5Mm_{10}$ | Amo | A | A | A | AA |
| 2 | $Al_{85}Fe_5Mm_{10}$ | Amo | A | A | A | AA |
| 3 | $Al_{88}Fe_9Mm_3$ | Amo | A | A | A | AA |
| 4 | $Al_{88}Co_{10}Mm_2$ | Amo | A | A | A | AA |
| 5 | $Al_{80}Ni_{10}Mm_{10}$ | Amo | A | A | A | AA |
| 6 | $Al_{85}Ni_5Mm_{10}$ | Amo | A | A | A · | AA |
| 7 | $Al_{85}Cu_5Mm_{10}$ | Amo | A | A | A | AA |
| 8 | $Al_{93}Fe_2Y_5$ | Amo + Cry | B | A | A | AA |
| 9 | $Al_{88}Cu_2Y_{10}$ | Amo | A | A | A | AA |
| 10 | $Al_{88}Cu_6Y_6$ | Amo + Cry | B | A | A | AA |
| 11 | $Al_{90}Ni_5Y_5$ | Amo | A | A | A | AA |
| 12 | $Al_{93}Co_2La_5$ | Amo | A | A | A | AA |
| 13 | $Al_{93}Fe_2La_5$ | Amo + Cry | B | A | A | AA |
| 14 | $Al_{90}Ni_5La_5$ | Amo + Cry | A | A | A | AA |
| 15 | $Al_{85}Ni_{7.5}La_{7.5}$ | Amo | A | A | A | AA |
| 16 | $Al_{88}Cu_7Ce_5$ | Amo | A | A | A | AA |
| 17 | $Al_{45}Ni_{30}La_{25}$ | Amo + Cry | B | A | A | C |
| 18 | $Al_{60}La_{40}$ | Amo | C | C | A | C |
| 19 | Al(4N) | Cry | C | C | A | C |
| 20 | 2024 Alloy | Cry | C | C | C | C |

TABLE 3-continued

| Sample No. | Chemical composition (atom %) | Structure | Corrosion test in 1N—HCl | Corrosion test in 1N—NaOH | Toughness | Overall evaluation |
| --- | --- | --- | --- | --- | --- | --- |
| 21 | $Al_{88}Si_{12}$ | Cry | C | C | C | C |

Amo: amorphous
Cry: crystalline

TABLE 4

| Sample No. | Alloy composition (atom %) | Particle thickness (μm) | Aspect ratio | Minor axis/major axis dimension (μm) | State of coatings | Corrosion resistance test |
| --- | --- | --- | --- | --- | --- | --- |
| 2 | $Al_{85}Fe_5Mm_{10}$ | 0.5~4 | ≧5 | 10~500 | Well oriented with good smoothness | Good after 24 hrs |
| 5-1 | $Al_{80}Ni_{10}Mm_{10}$ | 0.5~4 | 10~400 | 10~400 | Good coating, well oriented | " |
| 5-2 | " | <0.1 | ≧5 | " | Many holes in coating with poor orientation | Ground corroded after 24 hrs |
| 5-3 | " | 0.5~4 | <5 | 5~18 | Poorly oriented | Ground corroded after 24 hrs |
| 5-4 | " | Spherical powder | | | Good smoothness, easily coated | Ground corroded after 24 hrs |
| 5-5 | " | 0.5~4 | ≧5 | >500 | Poor surface smoothness | Not tested |
| 6 | $Al_{85}Ni_5Mm_{10}$ | " | " | 10~500 | Well oriented with good smoothness | Good after 24 hrs |
| 9 | $Al_{88}Cu_2Y_{10}$ | " | " | " | " | " |
| 11 | $Al_{90}Ni_5Y_5$ | " | " | " | " | " |
| 14 | $Al_{90}Ni_5La_5$ | " | " | " | " | " |
| 15 | $Al_{85}Ni_{7.5}La_{7.5}$ | " | " | " | " | " |
| 19 | Al(4N) | 0.3 | " | 10~30 | " | Ground corroded after 16 hrs |

EXAMPLE 3

Using the apparatus as illustrated in FIG. 1, 500 g of soda glass was charged in a crucible made of graphite, and was melted at 1,500° C. to make the melt 1.

The resulting melt 1 was flowed out and dropped from the nozzle 2, and argon gas was sprayed from the atomizing nozzle 3 against the dropping melt 1 under a pressure of 100 kg/cm² to form the droplets 5. The droplets 5 were brought to collide against an cone type rotating cooling member having a roll diameter of 300 mmφ, a cone angle of 120° and a revolution number of 7,200 rpm to obtain a flaky powder comprising leaf-shaped particles.

The resulting powder was classified and batched off to give a powder having the shape properties of a thickness of 0.5 to 5 μm (average; 2 μm), a minor axis/major axis of from 5 to 500 μm, an aspect ratio of not less than 5 (average: 20), and a ratio of the minor axis to the major axis, of from 1 to 10. Yield of the powder obtained was 68%.

COMPARATIVE EXAMPLE 1

A balloon (a hollow sphere) made of soda-lime glass was mechanically ground to obtain glass powder. This glass powder was classified to obtain a powder comprising particles having a thickness of from 2 to 5 μm (average: 3 μm), a minor axis/major axis of from 10 to 100 μm, an average aspect ratio of 13 and a ratio of the minor axis to the major axis, of from 1 to 10.

Microscopic observation revealed that the powder obtained in Example 3 comprised the particle having the shape as shown in FIG. 6 and the powder obtained in Comparative Example 1 comprised the particle having the shape as shown in FIG. 5.

EXPERIMENT 3

Mixed were 85 vol.% of a polyvinyl acetate resin and 15 vol.% of the powder of Example 3 or Comparative Example 1, and added to the mixture was 5% of a solvent as a diluent, thus preparing a coating material continuing the powder of Example 3 and a coating material containing the powder of Comparative Example 1, respectively.

SS41 steel sheets of 3.2 mm in thickness, 20 mm in width and 50 mm in length were made ready for use and applied with sandblasting treatment. Thereafter, they were subjected to ultrasonic washing in Trichlene, and then the respective coating materials prepared in the above were coated thereon by brushing so as to give a coating thickness of about 100 μm.

After drying, observed was the state of the coatings and also carried out were corrosion resistance tests. The corrosion resistance tests were carried out by immersing the coatings in aqua regia of 20° C. to examine the time by which the mother materials were melted out. Results thus obtained are shown in Table 5 (set out on a later page).

EXAMPLE 4

Using the apparatus as illustrated in FIG. 1, 400 g of zinc of 99.99% purity was set in a crucible made of alumina, and was melted at 500° C. to make the melt 1. The resulting melt 1 was flowed out and dropped form the nozzle 2, and argon gas was sprayed from the atomizing nozzle 3 against the dropping melt 1 under a pressure of 80 kg/cm² to form the droplets 5. The droplets 5 were brought to collide against an cone type rotating cooling member having a roll diameter of 300 mmφ, a cone angle of 120° and a revolution number of 7,200 rpm to obtain a flaky powder comprising leaf-shaped particles.

The resulting powder was classified and batched off to give a powder having the shape characteristics of a thickness of 0.5 to 5 μm, a minor axis/major axis of from 5 to 500 μm, a minor axis/major axis of from 5 to 500 μm, an aspect ratio of not less than 5, and a ratio of the minor axis to the major axis, of from 1 to 10. Yield of the powder obtained was 81%.

COMPARATIVE EXAMPLE 2

Made ready for use was a commercially available zinc spherical powder obtained by a gaseous phase method. This spherical powder comprises zinc having a 99.9% or more purity and has an average particle diameter of 25 μm.

EXPERIMENT 4

Using an inorganic binder obtained by adding a small amount of sodium bicarbonate in an aqueous solution of sodium silicate, the zinc powder obtained in Example 4 or Comparative example 2 was added therein in an amount of 65, 70, 75, 80, 85 or 90% by weight to obtain the respectively corresponding coating materials.

SS41 steel sheets of 3.2 mm in thickness, 20 mm in width and 50 mm in length were made ready for use and applied with sandblasting treatment. Thereafter, they were subjected to ultrasonic washing in Trichlene, and then the respective coating materials prepared in the above were coated thereon by brushing so as to give a coating thickness of about 100 μm. Thereafter, an aqueous phosphoric acid solution was sprayed thereon to effect hardening.

After the coatings were dried, carried out were corrosion resistance tests in brine. To carry out the corrosion resistance tests, cuts in crosses were made on coatings, which were immersed in 3% brine to examine blisters of coatings owing to the progress of corrosion from the cuts or melting-out of iron. Temperature of the brine was set to 25±2° C. Results obtained are shown in Table 6 (set out on a later page).

EXAMPLE 5

Using the apparatus as illustrated in FIG. 1, 500 g of a stainless steel (SUS316) ingot was set in a crucible made of alumina, and was melted at 1,550° C. to make the melt 1. The resulting melt 1 was flowed out and dropped from the nozzle 2, and argon gas was sprayed from the atomizing nozzle 3 against the dropping melt 1 under a pressure of 80 kg/cm$^2$ to form the droplets 5. The droplets 5 were brought to collide against an cone type rotating cooling member having a roll diameter of 300 mmφ, a cone angle of 120° and a revolution number of 7,200 rpm to obtain a flaky powder comprising leaf-shaped particles.

The resulting powder was classified and batched off to give a powder having the shape characteristics of a thickness of 0.5 to 5 μm, a minor axis/major axis of from 5 to 500 μm, an aspect ratio of not less than 5, and a ratio of the minor axis to the major axis, of from 1 to 10. Yield of the powder obtained was 72%.

COMPARATIVE EXAMPLE 3

Made ready for use was a commercially available stainless steel (SUS316) powder. This powder was obtained by forming a melt of stainless steel (SUS316) into an irregular-particle powder by a water atomizing method, and by annealing the resulting powder. In that occasion, 5% of zinc stearate is added, and then the powder is forced to have flat particles in a ball mill. The resulting powder has an irregular particle shape, which is of a thickness of from 1 to 10 μm, a minor axis/major axis of from 5 to 500 μm, and an aspect ratio of from 10 to 100.

EXPERIMENT 5

In regard to the stainless steel powder obtained in Example 5 and the stainless steel powder of Comparative Example 3, examined were the state when they were immersed in 2N-HCl, the crevice corrosiveness and the shapes. Results obtained are shown in Table 7 (set out on a later page).

Also, mixed were 85 vol.% of a polyvinyl acetate resin and 15 vol% of the powder of Example 5 or Comparative example 3, and added to the mixture was 5% of a solvent as a diluent, thus preparing a coating material containing the powder of Example 5 and a coating material containing the powder of Comparative Example 3, respectively.

SS41 steel sheets of 3.2 mm in thickness, 20 mm in width and 50 mm in length were made ready for use and applied with sandblasting treatment. Thereafter, they were subjected to ultrasonic washing in Trichlene, and then the respective coating materials prepared in the above were coated thereon by brushing so as to give a coating thickness of about 100 μm.

After drying, observed was the state of the coatings and also carried out were corrosion resistance tests. The corrosion resistance tests were carried out by immersing the coatings in aqua regia of 20° C. to examine the time by which the mother materials were melted out. Results thus obtained are shown in Table 8 (set out on a later page).

EXAMPLE 6

Using the apparatus as illustrated in FIG. 1 500 g of a copper ingot of 99% purity was set in a crucible made of graphite, and was melted at 1,250° C. to make the melt 1. The resulting melt 1 was flowed out and dropped from then nozzle 2, and nitrogen gas was sprayed from the atomizing nozzle 3 against the dropping melt 1 under a pressure of 80 kg/cm$^2$ to form the droplets 5. The droplets 5 were brought to collide against an con type rotating cooling member having a roll diameter of 300 mmφ, a cone angle of 45° and a revolution number of 10,000 rpm to obtain a flaky powder comprising leaf-shaped particles.

The resulting powder was classified and batched off to give a powder having the shape characteristics of a thickness of 0.5 to 5 μm, a minor axis/major axis of from 5 to 500 μm, an aspect ratio of not less than 5, and a ratio of the minor axis to the major axis, of from 1 to 10. Yield of the powder obtained was 75%.

COMPARATIVE EXAMPLE 4

Made ready for use were three kinds of commercially available copper powders. More specifically, they are an electrolytic powder (dendritic particles; particle diameter: 10 to 40 μm), a powder obtained by grinding the electrolytic powder (leafy particles; particle diameter; 10 to 40 μm), and an atomized powder (spherical particles; particle diameter: 10 to 40 μm).

EXPERIMENT 6

Using an inorganic binder obtained by adding a small amount of sodium bicarbonate in an aqueous solution of sodium silicate, the copper powder obtained in example 6 or Comparative Example 4 was added therein in an amount of 40% by weight to prepare the respectively corresponding coating materials.

On calcium silicate sheets of 3 mm in thickness, 150 mm in length and 75 mm in width, the respective coating materials prepared in the above were coated by brushing so as to give a coating thickness of about 100 μm. Thereafter, an aqueous phosphoric acid solution was sprayed thereon to effect hardening.

After the coatings were dried, the electrical resistance and 100 MHz electromagnetic shielding effect were measured according to the Advance method. Results obtained are shown in Table 9 (set out on a later page).

EXAMPLE 7

Using the apparatus as illustrated in FIG. 1, 200 g of an aluminum ingot of 99.9% purity was set in a crucible made of graphite, and was melted at 800° C. to make the melt 1. The resulting melt 1 was flowed out and dropped from the nozzle 2, and nitrogen gas was sprayed from the atomizing nozzle 3 against the dropping melt 1 under a pressure of 80 kg/cm² to form the droplets 5. The droplets 5 were brought to collide against an cone type rotating cooling member having a roll diameter of 300 mmφ, a cone angle of 90° and a revolution number of 7,200 rpm to obtain a flaky powder comprising leaf-shaped particles.

The resulting powder was classified and batched off to give a powder having the shape characteristics of a thickness of 0.5 to 5 μm, a minor axis/major axis of from 5 to 500 μm, an aspect ratio of not less than 5, and a ratio of the minor axis to the major axis, of from 1 to 10. Yield of the powder obtained was 76%.

COMPARATIVE EXAMPLE 5

A commercially available aluminum flat powder was made ready for use. This powder comprises aluminum particles of 99.9% purity, having a thickness of 0.5 to 2.0 μm, a minor axis/major axis of from 5 to 500 μm, and an aspect ratio of from 10 to 100.

EXPERIMENT 7

Mixed into 42% by weight of coconut oil modified short oil alkyd resin vanish, 15% by eight of butylated melamine resin vanish and 11% by weight of a solvent was 32% by weight of the aluminum powder of Example 7 or Comparative Example 5 to prepare the respectively corresponding coating materials.

On steel sheets of 3.2 mm in thickness, 200 mm in width and 500 mm in length, applied was a thin film type zinc phosphate formation film treatment as a ground treatment, and thereafter the respective coating materials were coated by brushing so as to give a coating thickness of about 50 μm and by baking at 110 to 130° C.

In regard to the coatings thus obtained, their cross sections were observed to examine the orientation of the pigment aluminum powder. As a result, the coating containing the powder of Example 7 had a good orientation, and the one continuing the powder of Comparative Example 5 showed somewhat poor orientation.

In regard to the respective coatings, mirror surface reflectance was also measured and found to be 90% or more for the one containing the powder of Example 7 and about 85% for the one containing the powder of Comparative Example 5. Thus, the powder obtained in the present invention has superior performance also in metallic coating.

TABLE 5

(Experiment 3)

| Powder used | Particle shape | State of corrosion in aqua regia |
|---|---|---|
| Example 3 | Leaf-shaped | No change occured after 24 hrs |
| Comparative Example 1 | Irregular flat | Ground corroded after 24 hrs |

TABLE 6

(Experiment 4)

| Powder used | Amount of powder added (% by weight) | | | | | |
|---|---|---|---|---|---|---|
|  | 65 | 70 | 75 | 80 | 85 | 90 |
| Example 4 | A | A | A | A | A | A |
| Comparative Example 2 | C | B | A | A | A | A |

(Evaluation in the table is based on the criterions as follows:
C Blisters of coatings are seen.
B Melting-out of iron is seen.
A No melting-out of iron.)

TABLE 7

(Experiment 5)
2N—HCl

| Powder used | Right after immersion | One hour after immersion | Crevice corrosiveness |
|---|---|---|---|
| Example 5 | Not foamed | Solution kept transparent | Good |
| Comparative Example 3 | Vigorously foamed | Solution turned opaque | Poor |

TABLE 8

(Experiment 5)

| Powder used | State of corrosion in aqua regia |
|---|---|
| Example 5 | No blister or peel is seen after 24 hrs. |
| Comparative Example 3 | Bottom blisters were generated after 16 hrs to cause ground corrosion |

TABLE 9

(Experiment 6)

| | Electrical resistance of coatings (Ω · 100 μm) | 100 MHz electromagnetic shielding effect (dB) |
|---|---|---|
| Example 6 | 0.8–1.5 | 42 |
| Electrolytic powder (dendritic) | 1.0–3.6 | 35 |
| Ground electrolytic powder (leafy) | Infinity | 8 |
| Atomized powder (spherical) | Infinity | 4 |

What is claimed is:

1. A method of preparing an additive powder for coating materials or plastics, comprising melting a metal or glass starting material, expelling the resulting melt to flow out from a nozzle and jetting a gas to the melt to form droplets of the melt, followed by cooling to effect solidification to form a powder, wherein a rotating cooling member having the shape of a cone or horn is provided in the direction of the flow of said droplets, and wherein said droplets of said melt are directed to contact an outer inclined surface of said rotating cooling member to cool and solidify said droplets.

2. The method according to claim 1, wherein said starting material comprises at least one material selected from the group consisting of
   (a) an amorphous alloy consisting essentially of from 5 to 12% of Ni, from 5 to 25% of Cr, from 0.3 to 5.0% of Mo, from 8 to 13% of P, from 7 and 15% of C, all in atom %, and the balance being Fe and inevitable impurities;

(b) an amorphous alloy consisting essentially of from 5 to 40% of Cr, from 15 to 25% of P, all in atom %, and the balance being Ni and inevitable impurities;

(c) an amorphous alloy consisting essentially of rom 40 to 60% of (Nb, Ta) in atom %, and the balance being Ni and inevitable impurities;

(d) an aluminum alloy having the composition represented by the formula:

$$Al_aM_bX_c$$

, wherein M represents one or more of metallic element(s) selected from the group consisting of V, Cr, Mn, Fe, Co, Ni, Cu, Zr, Ti, Mo, W, Ca, Li, Mg and Si; X represents one or more element(s) selected from the group consisting of Y, La, Ce, Sm, Nd, Hf, Nb, Ta and Mm (Misch metal); and a, b and c are $50 \leqq a \leqq 95$, $0.5 \leqq b \leqq 35$ and $0.5 \leqq c \leqq 25$ in atom %, respectively;

and comprising an amorphous phase or an amorphous and finely crystalline mixed phase;

(e) glass;
(f) zinc;
(g) stainless steel;
(h) aluminum;
(i) copper;
(j) nickel; and
(k) silver.

3. The method according to claim 1, wherein a powder comprising a particle having a thickness of 0.5 to 5 μm, a minor axis of at least 5 to 500 μm and a major axis of not more than 500 μm, an aspect ratio which is the ratio of the major axis to the thickness of not less than 5:1, and a ratio of the minor axis to the major axis, of from 1:1 to 1:10 is batched off from said powder having been solidified.

4. The method according to claim 1, wherein said gas is jetted under a pressure of not less than 20 kg/cm², said rotating cooling member is cooled to not more than 50° C., and said rotating cooling member is rotated with a revolution number of rom 1,000 to 20,000 rpm.

5. The method according to claim 3, wherein the powder has a thickness of 1 to 4 μm, a minor axis of at least 5 μm and a major axis of not more than 400 μm and the ratio of the minor axis to the major axis is from 1:1 to 1:5.

6. The method according to claim 1, wherein the starting material comprises an amorphous alloy consisting essentially of from 5 to 12% of Ni, from 5 to 25% of Cr, from 0.3 to 5.0% of Mo, from 8 to 13% of P, from 7 to 15% of C, all in atom %, and the balance being Fe and inevitable impurities.

7. The method according to claim 1, wherein the starting material comprises an amorphous alloy consisting essentially of from 5 to b 40% of Cr, from 15 to 25% of P, all in atom %, and the balance being Ni and inevitable impurities.

8. The method according to claim 1, wherein the starting material comprises an amorphous alloy consisting essentially of from 40 to 60% of (Nb, Ta) in atom %, and the balance being Ni and inevitable impurities.

9. The method according to claim 1, wherein the starting material comprises an amorphous alloy consisting essentially of an aluminum alloy having the composition represented by the formula:

$$Al_aM_bX_c$$

wherein M represents one or more of metallic element(s) selected from the group consisting of V, Cr, Mn, Fe, Co, Ni, Cu, Zr, Ti, Mo, W, Ca, Li, Mg and Si; X represents one or more element(s) selected from the group consisting of Y, La, Ce, Sm, Nd, Hf, Nb, Ta and Mn (Misch metal); and a, b and c are $50 \leqq a \leqq 95$, $0.5 \leqq b \leqq 35$ and $0.5 \leqq c \leqq 25$ in atom %, respectively;

and comprising an amorphous phase or an amorphous and finely crystalline mixed phase.

10. The method according to claim 1, wherein the starting material comprises glass.

11. The method according to claim 1, wherein the starting material comprises zinc.

12. The method according to claim 1, wherein the starting material comprises stainless steel.

13. The method according to claim 1, wherein the starting material comprises aluminum.

14. The method according to claim 1, wherein the starting material comprises copper.

15. The method according to claim 1, wherein the starting material comprises nickel.

16. The method according to claim 1, wherein the starting material comprises silver.

17. The method according to claim 3, wherein the major axis is longer than the minor axis to provide an elliptical leaf-shaped powder.

18. The method according to claim 3, wherein the minor axis and the major axis have a ratio of 1:1 to provide a circular leaf-shaped powder.

19. The method according to claim 1, wherein said rotating cooling member has an axis of rotation in the direction of said flow of said droplets and which method further comprises after solidification, scattering the powder under a centrifugal force of said rotating cooling member and then collecting the powder.

20. The method according to claim 1, wherein the gas is jetted under a pressure of not less than 40 kg/cm².

21. The method of claim 19, wherein the gas is jetted under a pressure is not less than 70 kg/cm².

22. The method of claim 21, wherein said rotating cooling member is rotated with a revolution number of 3,000 to 12,000 rpm.

23. The method of claim 1, wherein said rotating cooling member has the shape of a cone.

24. The method of claim 1, wherein said rotating cooling member has the shape of a horn.

* * * * *